Jan. 11, 1944.  D. A. McLEAN  2,339,091
STABILIZED HALOGENATED COMPOUNDS AND APPARATUS CONTAINING THEM
Filed Nov. 14, 1940
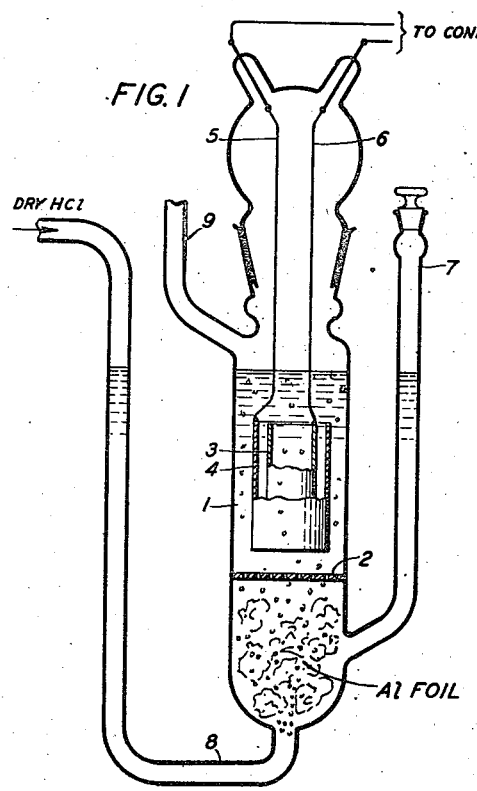
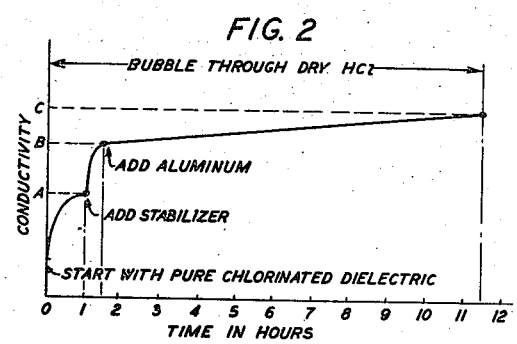
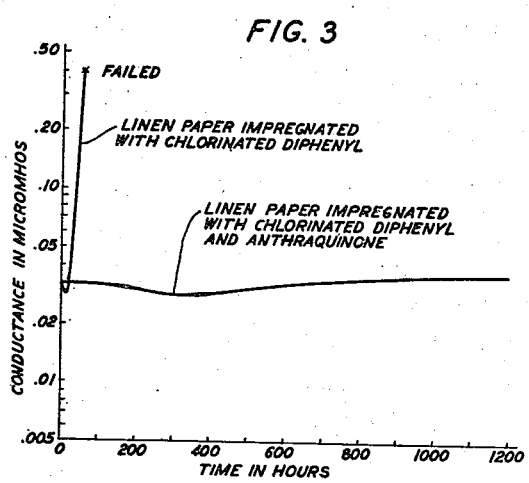
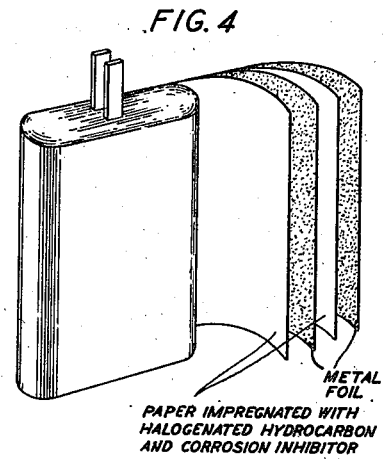
INVENTOR
D. A. McLEAN
BY
ATTORNEY Patented Jan. 11, 1944

2,339,091

UNITED STATES PATENT OFFICE 2,339,091

STABILIZED HALOGENATED COMPOUND AND APPARATUS CONTAINING IT

David A. McLean, Chatham, N. J., assignor to Bell Telephone Laboratories, Incorporated, New York, N. Y., a corporation of New York Application November 14, 1940, Serial No. 365,641

20 Claims. (Cl. 175—41)

The present invention relates to compositions of matter comprising halogen-containing organic substances which are treated to render them non-corrosive of metals, and to apparatus, more particularly electrical apparatus, such as electrical condensers, in which such treated halogen-containing organic substances are maintained in contact with metal.

The present application is a continuation in part of the application of D. A. McLean, Serial No. 227,652, filed August 31, 1938.

It is an object of the present invention to prolong the life of electrical capacitors which employ, in contact with metal armatures, dielectrics containing organic substances which possess halogen atoms within their molecules, and to stabilize such capacitors so that their dielectrics retain more uniform values of leakage current and power factor.

It is a more general object of the present invention to treat halogen-containing organic substances which are maintained in contact with metal, or are intended to be maintained in contact with metal, so as to render them non-corrosive.

Halogenated aryl compounds and more particularly the halogenated aromatic hydrocarbons, such as chlorinated diphenyl and chlorinated naphthalene, are known to be useful electrical insulating materials because of their relatively high thermal stability, resistance to oxidation, non-inflammability, low conductivity and other valuable properties. Most of the halogenated aromatic hydrocarbons used commercially are made up of polar molecules and therefore possess a high dielectric constant which makes them especially useful in capacitors.

Despite these advantages dielectrics containing such compounds often deteriorate at a faster rate than do the dielectric materials which do not contain halogens, particularly when employed under moderately elevated temperatures, high electrical stress or both. This deterioration may manifest itself in one or more of three ways. The leakage current may rise to an unduly high value or in the case of condensers operating on alternating current the power factor may rise unduly. The deterioration may also result in the complete breakdown of the dielectric within a short time causing a short-circuit of the apparatus.

This deterioration has been found to be associated with a chemical interaction between the metallic elements of the apparatus and the halogenated compounds or their halogen-containing decomposition products.

When the metal in contact with the halogenated compound is aluminum, it is apparently the decomposition products of the halogenated material which interact with the metal. In an electrical capacitor, for instance, having aluminum armatures separated by paper which is impregnated with a halogenated aromatic hydrocarbon such as chlorinated naphthalene or chlorinated diphenyl, it appears that upon the application of an electrical potential, particularly at a moderately elevated temperature, hydrogen chloride is split off from the chlorinated compound. The hydrogen chloride or halogen ion from other decomposition products appears to attack the aluminum armatures forming aluminum chloride, which is a powerful catalyst for the decomposition of organic compounds. The thus-formed aluminum chloride causes the further decomposition of the chlorinated impregnant, with the production of more halogen-containing decomposition products, which react with the aluminum, forming more aluminum chloride. The cycle is thus continued at an accelerated rate. Both the hydrogen chloride and the aluminum chloride contribute to the decomposition of the paper and also increase local conductivity causing the generation of heat which accelerates the breakdown of the chlorinated impregnant and which accelerates the electrolysis of the paper. The hydrogen chloride which is split off in the initial decomposition of the chlorinated compound is produced in such small quantities that it would not cause the rapid destruction of the dielectric, but the accelerating action of the aluminum chloride produced by the reaction of the hydrogen chloride with the metal armatures causes relatively rapid deterioration.

In other cases, such as when tin is maintained in contact with the halogenated hydrocarbon, there appears to be a direct reaction between the halogenated substance and the metal without the necessity of the application of an electric field. Thus when an electrical capacitor made up of tin foil armatures separated by paper which is impregnated with a halogenated aromatic hydrocarbon, such as chlorinated naphthalene or chlorinated diphenyl, is heated to moderately elevated temperatures, it shows an initial high power factor. Similar condensers having aluminum electrodes have, by way of contrast, a relatively low initial power factor when heated to moderately elevated temperatures; the power factor increases only after the application of an electrical potential which, as discussed above, is assumed to cause the splitting off of hydrogen chloride from the impregnant. The high initial power factor of the tin foil capacitors obviously results from a direct interaction between the halogenated impregnant and the tin foil armatures at elevated temperatures.

Having determined the cycle of deterioration described above, applicant reasoned that the unduly rapid breakdown of the condenser dielectrics in these cases might be eliminated by interrupting the cycle at some point in its operation. Since the initial formation of hydrogen chloride due to decomposition of halogenated impregnant is not of itself sufficient to cause rapid deterioration in the absence of other harmful reaction products whose formation is induced by the armature metals present, applicant reasoned further that if some means could be devised to prevent the metal armatures from being attacked by either the halogenated impregnant or its decomposition products the objectionable deterioration could be largely eliminated.

The present invention is based upon the discovery that the addition of corrosion inhibitors to the halogenated aromatic hydrocarbons or other halogenated organic compounds used for impregnants in electric capacitors will decrease to a marked extent the deterioration of the dielectric, as evidenced by longer life and lower and more uniform values of leakage current and power factor. When aluminum or tin armatures are employed, the most effective corrosion inhibitors which have been found are those organic compounds which possess the quinoid structure, the most available of these compounds being the quinones. These substances are in general soluble in the halogenated aromatic hydrocarbons and similar materials. The addition of less than 1 per cent of a quinone to the halogenated aromatic hydrocarbons used for impregnating electrical capacitors will under certain conditions increase the life of the capacitor as much as twenty times.

The fact that the quinones increase the life of electrical capacitors by interrupting the cycle of deterioration by inhibiting the interaction of the generated hydrochloric acid with the metal armatures can be shown by a simple test using the test cell shown in the drawing, in which:

Fig. 1 is a diagrammatic showing of a conductivity cell which may be used for determining the suitability of any particular corrosion inhibitor for stabilizing halogenated organic compounds;

Fig. 2 is a chart showing the change in conductivity with time of the halogenated compound during the operation of the conductivity cell of Fig. 1;

Fig. 3 is a chart showing the change in leakage current with time in two electric capacitors impregnated with a halogenated organic compound, one of said capacitors containing a corrosion inhibitor and the other containing no inhibitor; and Fig. 4 represents a simple rolled condenser made up of two sheets of metal foil separated by two dielectric sheets.

In the conductivity cell shown in Fig. 1 a tubular glass reaction chamber 1 divided longitudinally by a perforated glass disc 2 encloses a pair of concentric cylindrical metal electrodes 3 and 4. These metal electrodes are formed of any suitable non-corroding metal such as heavily gold-plated brass. To each of the electrodes is attached a lead 5, 6 which passes to the outside of the reaction chamber and runs to a conductivity bridge as indicated in the drawing. The lower section of the reaction chamber contains a side arm 7 for the insertion of liquid and solid reagents and a bottom inlet 8 for the introduction of gaseous hydrogen chloride. An outlet 9 is provided in the upper portion of the reaction chamber to permit the escape of unabsorbed gases.

In the operation of the cell the reaction chamber is filled with pentachlor diphenyl and the whole is maintained at 100° C. while dry hydrogen chloride is introduced into the bottom of the reaction chamber and allowed to bubble through the halogenated compound until it has become saturated. The conductivity of the liquid lying between the two concentric electrodes is measured periodically. As the hydrogen chloride is introduced the conductivity rises until saturation is reached, at which point the conductivity assumes a fairly constant value. A small amount of the corrosion inhibitor to be tested is then added to the reaction chamber and the bubbling of hydrogen chloride through the mixture is continued. The conductivity may remain fixed or may rise to a new stable value when saturation is reached. Small pieces of aluminum foil of the type commonly employed in electrical condensers (such as the standard condenser foil produced by the Aluminum Co. America) are then inserted in the reaction chamber through the side inlet 7 and the introduction of hydrogen chloride is continued. Such aluminum foil has a purity in the vicinity of 99.8 per cent and is extremely thin, providing a substantial surface. After the addition of the foil, the conductivity again rises at a rate which is dependent upon the efficiency of the corrosion inhibitor which has been added.

If the aluminum foil is added to pentachlor diphenyl containing no corrosion inhibitor and hydrogen chloride is bubbled through the mixture, the conductivity increases rapidly to a high value. If an effective inhibitor such as a quinone is added to pentachlor diphenyl prior to the introduction of the aluminum foil, the conductivity increases only very slightly over a relatively long period of time. It is thus quite clear that the quinones are effective inhibitors of the reaction between hydrogen chloride and aluminum which causes a rapid increase in the conductivity of halogenated compounds maintained in contact with aluminum. Other less effective inhibitors when added to the pentachlor diphenyl in the test cell before the addition of the aluminum foil will cause an increase in conductivity after the addition of the aluminum foil which proceeds at a rate greater than in the case of the quinones but less than when no inhibitor is used.

It can thus be seen that the conductivity cell affords a simple test for determining the suitability of various corrosion inhibitors for the stabilization of halogenated compounds to be used for impregnating electric capacitors or for similar purposes. In the test described above, pentachlor diphenyl has been used as representative of the halogenated organic compounds in measuring the relative effectiveness of inhibitors. In general, the results obtained with pentachlor diphenyl for the relative effectiveness of inhibitors will be valid for other halogenated compounds. However, it is obvious that similar tests may be conducted with other specific halogenated compounds to be stabilized, if it is so desired.

Similarly in the test described above, aluminum has been used as the metal which accelerates decomposition. The results obtained with aluminum will in general indicate the suitable inhibitors to be used in apparatus wherein halogenated compounds are maintained in contact with tin. For apparatus employing other metals which accelerate deterioration, it may be desirable to employ these other metals in the test described above for determining the most suitable inhibitors.

In Fig. 2 is shown an idealized and generalized curve indicating the change in conductivity which takes place during the various phases of the test. It can be seen from this curve that the conductivity of the halogenated compound increases from a low value as hydrogen chloride is bubbled through it to a somewhat higher value at saturation, represented by the point A. After the stabilizer is added and the bubbling of hydrogen chloride is continued, the conductivity may rise to a new relatively stable value B, or it may remain fixed in which case the point B coincides with the point A. The degree of conductivity rise between the points A and B is dependent upon the character of the stabilizer. At the point B aluminum is added to the mixture and the bubbling of hydrogen chloride is continued. The conductivity thereafter rises at a rate which is dependent upon the effectiveness of the stabilizer. The point C represents the value of the conductivity 10 hours after the addition of the aluminum. It has been found that an inhibitor, to be satisfactory for stabilizing an electric capacitor, should not increase the conductivity between the points A and B by a value greater than three times the value of the conductivity at the point A. Further the corrosion inhibitor should be sufficiently effective to prevent the increase in conductivity above the point B in 10 hours from exceeding 75 per cent of the absolute value of the conductivity at the point B.

Fig. 3 is a chart illustrating the manner in which the leakage current of a capacitor is maintained at a low value and the life of the capacitor is increased by the addition of a small amount of corrosion inhibitor to the halogenated compound used for impregnating the capacitor. The curves in Fig. 3 show the change in conductance of the capacitors plotted against time. The test was run upon two sets of condensers each made up of two aluminum foil electrodes separated by sheets of linen paper impregnated with chlorinated diphenyl. In one case the impregnant consisted of pure chlorinated diphenyl whereas in the other case the chlorinated diphenyl impregnant contained ½ per cent anthraquinone by weight. It can be seen that the conductance of the unstabilized condenser increased rapidly causing failure of the dielectric after about 60 hours. The stabilized condenser changed very little in conductance over a long period of time and had not failed after 1200 hours. The tests were run at 100° C. under a potential of 400 volts direct current. Other quinones have a similar stabilizing effect.

Fig. 4 represents a conventional rolled condenser of the type to which the present invention is applicable. It is made up of two sheets of metal foil, such as tin or aluminum, separated by two sheets of paper or other porous spacer impregnated with a halogenated hydrocarbon containing a corrosion inhibitor, the interleaved sheets being rolled into the form shown in the drawing.

As stated above the quinones are the most satisfactory inhibitors which have been found for use with halogenated compounds, particularly in the presence of aluminum and tin. The ortho, meta and para quinones have also been found effective. Among the suitable quinones may be mentioned benzoquinone, naphthoquinone, acenaphthoquinone, anthraquinone and phenanthraquinone. Not only the quinones themselves but also the substituted derivatives of the quinones are effective as corrosion inhibitors. Any substituent which does not have an undue tendency to form ionized electrolytes in the presence of acidic materials, such as hydrogen chloride is satisfactory. Compounds which result in the formation of substantial quantities of ions cause too high a conductivity for satisfactory electrical use. Amino and hydroxy derivatives are objectionable because of their effect upon the ionization. Among the suitable substituted quinones may be mentioned toluoquinone, xyloquinone, methylanthraquinone and chloroanthraquinone.

Besides the quinones, the nitroaromatic compounds in which at least one nitro group is linked directly to a carbon atom in the benzene ring, maleic anhydride, sulphur and selenium have been found to be particularly effective corrosion inhibitors. The use of nitroaromatic compounds as corrosion inhibitors is more particularly described and claimed in the application of L. Egerton, Serial No. 365,633 filed November 14, 1940. The use of maleic anhydride as a corrosion inhibitor is described in more detail and claimed in the application of L. Egerton Serial No. 365,634 filed November 14, 1940. The use of sulphur and selenium as corrosion inhibitors are more particularly described in the application of L. Egerton, Serial No. 365,635 filed November 14, 1940, which issued June 23, 1942 as U. S. Patent 2,287,421.

The corrosion inhibitors of the present invention may be added in any suitable concentration to the halogenated compounds to be stabilized. All of the inhibitors described show some effectiveness in concentrations as low as .1 per cent by weight of the halogenated compounds but do not reach their full potential effectiveness below about .25 per cent. The full effect of the inhibitor is usually achieved when it is present in an amount of about 2 per cent by weight and further increases in concentration beyond this point will usually not result in any substantial increase in stability in the presence of a metal. However, obviously, considerably larger proportions of inhibitors may be employed if they do not impart otherwise undesirable properties to the mixture. Desirable concentrations are usually about .5 per cent and about 1 per cent.

Because of the solubility of the inhibitors described above in halogenated aromatic hydrocarbons the stabilized condensers of the present invention can be most conveniently prepared by dissolving the desired percentage of the inhibitor in the halogenated aromatic hydrocarbon impregnating compound. The rolled condensers, for example, may be prepared by interleaving any suitable paper, such as linen or kraft paper, between sheets of suitable metal foil, such as aluminum or tin foil, and rolling the interleaved sheets in the conventional manner. The rolled condenser may then be impregnated by a suitable process, such as vacuum impregnation, with a suitable halogenated aromatic compound having dissolved therein a small percentage of a corrosion inhibitor. As examples of suitable impregnating compounds may be mentioned, chlorinated diphenyl containing ½ per cent anthraquinone, chlorinated naphthalene containing ½ per cent anthraquinone, chlorinated diphenyl containing 1 per cent benzoquinone and chlorinated naphthalene containing 1 per cent naphthaquinone.

The effect of inhibitors in electrical capacitors having halogen-containing dielectrics has been described above. It is obvious that these same inhibitors will be of value in preventing the corrosive action of halogenated aromatic compounds in other pieces of apparatus and under other conditions where they are maintained in contact with metals, particularly with aluminum and tin. In so far as the same general mechanism of corrosion with resultant acceleration of decomposition is common to other organic compounds containing halogen atoms, the same inhibitors will be useful for preventing corrosion, as for instance in the case of halogenated straight chain aliphatic hydrocarbons, halogenated alicyclic hydrocarbons, halogenated oxygen-containing organic compounds and other halogen-containing compounds which by virtue of their halogen content tend to cause corrosion. For this reason the addition of a small amount of the above-described corrosion inhibitors to any of these halogenated organic compounds intended for technical uses may be desirable as a precaution against the corrosion of metals and the consequent accelerated decomposition of the halogen-containing compound.

The invention has been described in terms of its specific embodiments but it is to be understood that it is of broad application and is to be limited only by the scope of the appended claims. It is to be understood that the term "quinone" as used in the appended claims is intended to include not only the quinones themselves but also the substituted derivatives of the quinones.

What is claimed is:

1. A halogenated organic compound which by virtue of its halogen content tends to corrode metallic bodies with which it is maintained in contact at elevated temperatures and under an electric potential, said halogenated compound containing as a minor constituent an added substance possessing a quinoid structure.

2. A halogenated hydrocarbon stabilized against decomposition in the presence of a metal with an added quinone.

3. A halogenated cyclic hydrocarbon stabilized against the decomposition in the presence of a metal with a small percentage of anthraquinone.

4. Paper impregnated with a halogenated cyclic hydrocarbon containing a small percentage of anthraquinone to retard decomposition in the presence of a metal.

5. Chlorinated naphthalene having dissolved therein a small percentage of anthraquinone to retard decomposition in the presence of a metal.

6. Chlorinated diphenyl having dissolved therein a small percentage of anthraquinone to retard decomposition in the presence of a metal.

7. In an article or device wherein a metal is maintained in contact with a halogenated organic compound which by virtue of its halogen content tends to attack said metal or to form decomposition products which attack said metal, a corrosion inhibitor dissolved in said halogenated organic compound comprising an added quinone.

8. In an article or device wherein a metal selected from the group consisting of aluminum and tin is maintained in contact with a halogenated aromatic hydrocarbon which by virtue of its halogen content tends to attack said metal or to form decomposition products which attack said metal, a corrosion inhibitor dissolved in said halogenated organic compound comprising an added quinone.

9. In a device in which a dielectric is exposed to an electric potential and is maintained in contact with a metal, a dielectric comprising a halogenated aromatic hydrocarbon containing a corrosion inhibitor comprising a quinone.

10. In an electric capacitor comprising metal armatures, a dielectric comprising a halogenated organic compound which by virtue of its halogen content tends to attack said metal or to form decomposition products which attack said metal, said halogenated compound containing a minor proportion of a substance possessing the quinoid structure.

11. In an electric capacitor comprising metal armatures, a dielectric comprising a halogenated aromatic hydrocarbon containing a minor proportion of a quinone.

12. In an electric capacitor comprising armatures formed of a metal selected from the group consisting of aluminum and tin, a dielectric therebetween comprising a halogenated aromatic hydrocarbon and a quinone.

13. In an electric capacitor comprising metal armatures, a dielectric comprising a halogenated organic compound which by virtue of its halogen content tends to attack said metal or to form decomposition products which attack said metal and a minor proportion of anthraquinone.

14. In an electric capacitor comprising metal armatures, a dielectric comprising paper impregnated with chlorinated naphthalene containing a small percentage of anthraquinone.

15. In an electric capacitor comprising metal armatures, a dielectric comprising paper impregnated with chlorinated diphenyl containing a small percentage of anthraquinone.

16. A halogenated aromatic hydrocarbon stabilized against decomposition in the presence of a metal with an added quinone.

17. An electric capacitor comprising armatures formed of a metal selected from the group consisting of aluminum and tin separated by a dielectric comprising a chlorinated aromatic hydrocarbon and a quinone.

18. An electric condenser comprising a pair of electrodes and a dielectric therebetween comprising a halogenated cyclic hydrocarbon and anthraquinone.

19. An electric condenser comprising a pair of electrodes and a dielectric therebetween comprising a paper spacer impregnated with chlorinated diphenyl and anthraquinone.

20. An electric condenser comprising a pair of metal electrodes and a dielectric therebetween comprising a paper spacer impregnated with chlorinated naphthalene and anthraquinone.

DAVID A. McLEAN.